United States Patent [19]

Cohen

[11] Patent Number: 4,728,060

[45] Date of Patent: Mar. 1, 1988

[54] SPACE STATION ARCHITECTURE, MODULE, BERTHING HUB, SHELL ASSEMBLY, BERTHING MECHANISM AND UTILITY CONNECTION CHANNEL

[75] Inventor: Marc M. Cohen, Palo Alto, Calif.

[73] Assignee: The United States of America as represented by the Administrator of the National Aeronautics and Space Administration, Washington, D.C.

[21] Appl. No.: 588,036

[22] Filed: Mar. 9, 1984

[51] Int. Cl.⁴ .......................... B64G 1/12; B64G 1/64
[52] U.S. Cl. ............................... 244/159; 244/158 R; 244/161
[58] Field of Search ................... 244/158 R, 159, 161, 244/162; 52/81, 220, 221, 646, 648; 403/335, 336, 338; 405/188, 189, 192; 114/312, 314, 335

[56] References Cited

U.S. PATENT DOCUMENTS

| | | | |
|---|---|---|---|
| 3,348,352 | 10/1967 | Cummings | 244/159 |
| 3,420,470 | 1/1969 | Meyer | 244/158 R |
| 3,737,117 | 6/1973 | Belew | 244/161 |
| 3,851,491 | 12/1974 | Mason | 405/188 |
| 4,082,240 | 4/1978 | Heathman et al. | 244/161 |
| 4,334,816 | 6/1982 | Slysh | 244/159 |

FOREIGN PATENT DOCUMENTS 372382  4/1973  U.S.S.R. .............................. 403/338

OTHER PUBLICATIONS

Boeing Space Station Brochure, presented at the AIAA Annual Meeting, Washington, D.C., Apr. 10, 1985.
Rockwell Space Station Brochure, presented at the AIAA Annual Meeting, Washington, D.C., Apr. 10, 1985.
Aviation Week and Space Technology, "NASA Building Space Station Technology", Jul. 22, 1963, pp. 77–78, 81.
"Project Space Station", by Brian O'Leary, published by Stackpole Books, Harrisburg, Pa., 1983, p. 60.

*Primary Examiner*—Sherman D. Basinger
*Assistant Examiner*—Rodney A. Corl
*Attorney, Agent, or Firm*—Darrell G. Brekke; John R. Manning

[57] ABSTRACT

A space station (20) includes a plurality of modules (24) and berthing hubs (22), joined by interconnections (26) which are sideways connectable. The modules (24) and hubs (22) are fastened together in a triangular configuration in three dimensions. The interconnections (26) include a pair of opposed, axially aligned, flanged ports (50) and a clamp latch (52) formed from a plurality of sections (54, 56 and 58) hinged along their length and extending circumferentially around the flanged ports (50). A hermetic seal (63) is formed between the ports (50). A utilities connection channel (68) extends between the ports (50). The channel (68) has a shell (70) with utilities connectors (74) movable between an extended position to mating connectors in the modules (24) and a withdrawn position. Assembly sequence and common module shell structure is detailed.

33 Claims, 20 Drawing Figures

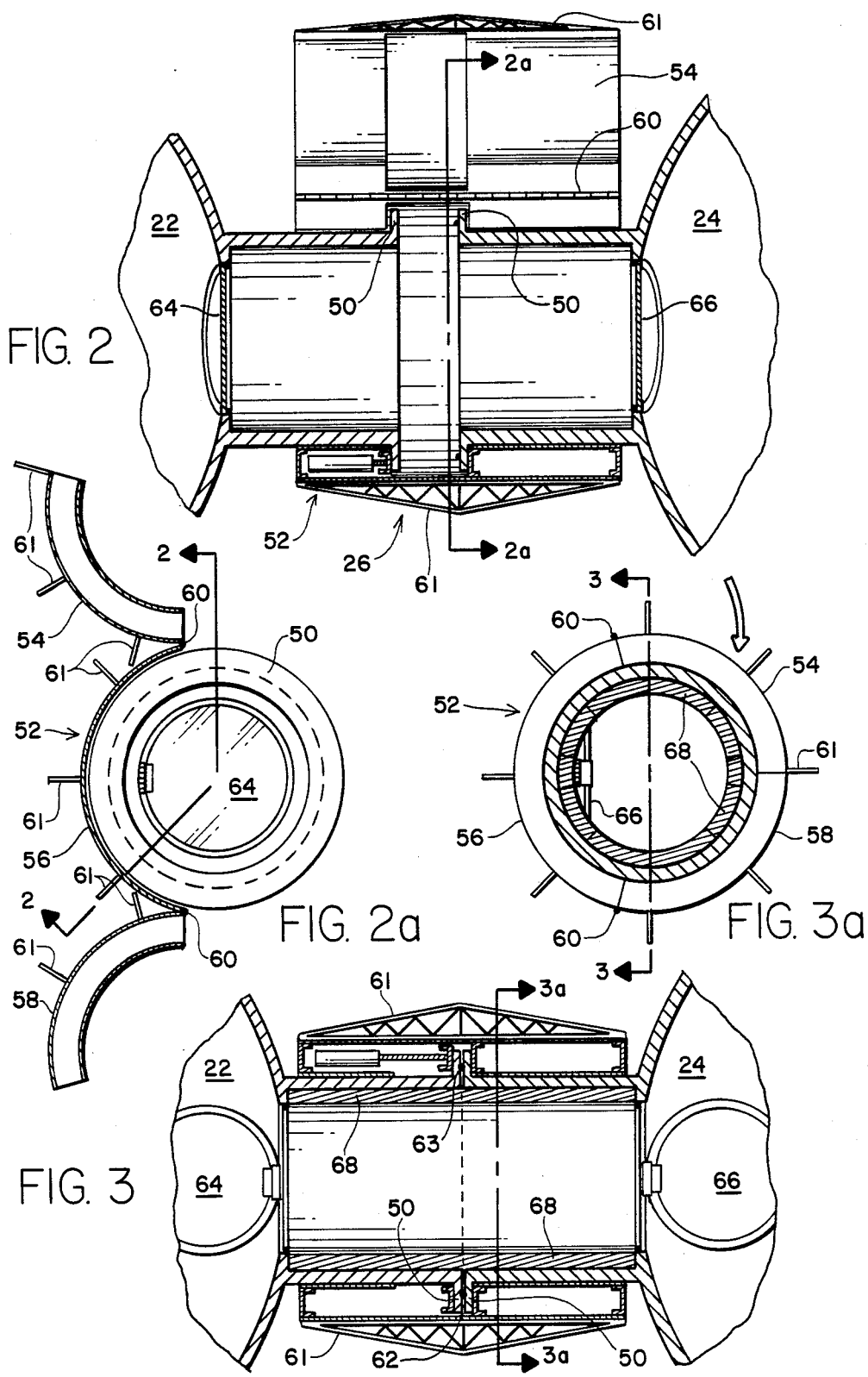

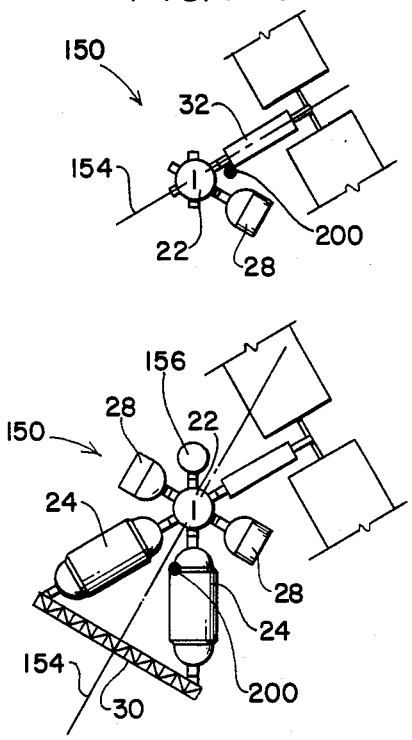
FIG. 12a
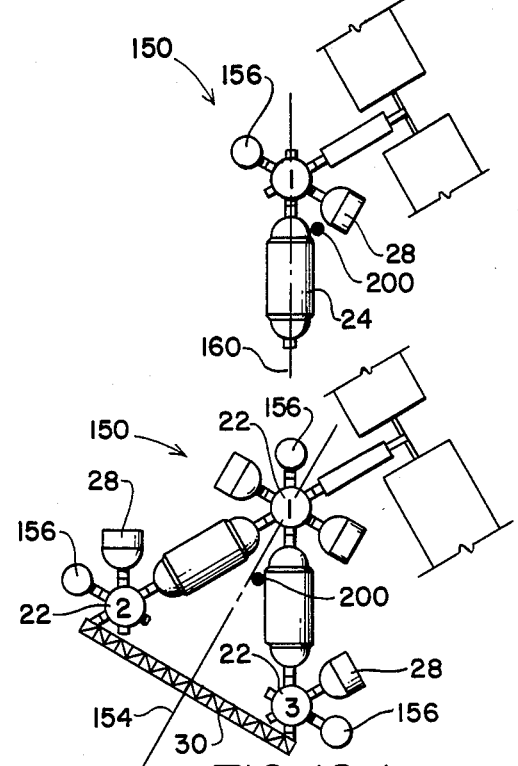
FIG. 12b
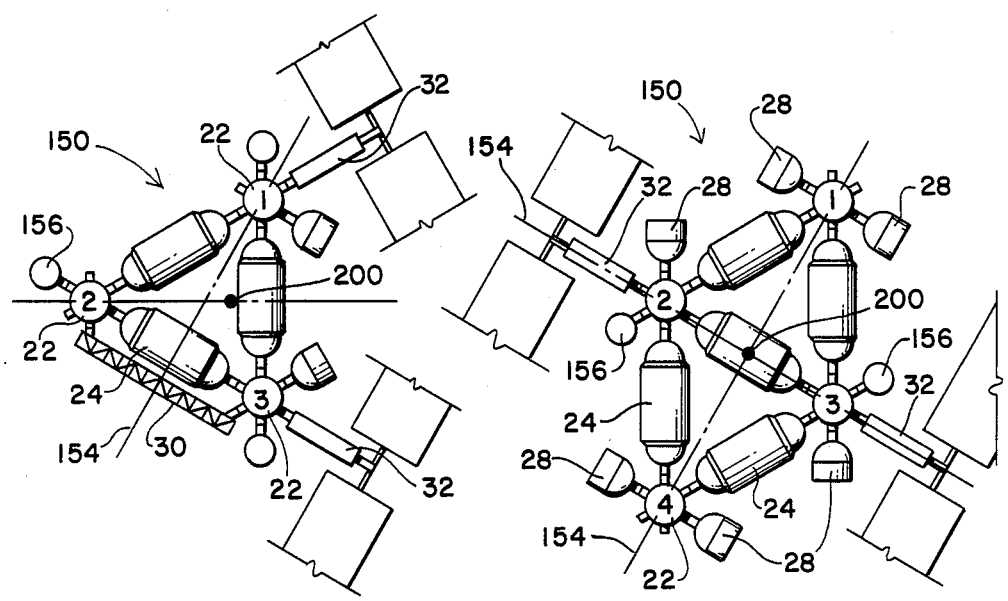
FIG. 12c
FIG. 12d
FIG. 12e
FIG. 12f

SPACE STATION ARCHITECTURE, MODULE, BERTHING HUB, SHELL ASSEMBLY, BERTHING MECHANISM AND UTILITY CONNECTION CHANNEL

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

1. Field of the Invention

This application relates to a novel form of a space station. More particularly, it relates to a geometric form in which modules are interconnected and to the assemblies for connecting controlled atmosphere modules to form a structure connected together in an improved geometrical configuration using an improved interconnection assembly and utility channel connection.

2. Description of the Prior Art

A variety of space station configurations is known in the prior art. However, a characteristic which tends to prevail in prior art space station designs is that they tend to import gravity bound geometric conventions to a gravity free atmosphere. Examples of prior art space station designs are disclosed in the following U.S. Patents: U.S. Pat. No. 3,144,219, issued Aug. 11, 1964 to Schnitzer; No. 3,169,725, issued Feb. 16, 1965 to Berglund; No. 3,300,162 issued Jan. 24, 1967 to Maynard et al.; No. 3,332,640, issued July 25, 1967 to Nesheim; No. 3,348,352, issued Oct. 24, 1967 to Cummings; No. 3,478,986, issued Nov. 18, 1969 to Fogarty; No. 3,744,739, issued July 10, 1973 to Weaver et al.; No. 4,057,207, issued Nov. 8, 1977 to Hogan; No. 4,299,066, issued Nov. 10, 1981 to Thompson; No. 4,308,699, issued Jan. 5, 1982 to Slysh; and No. 4,377,266, issued Mar. 22, 1983 to Belew et al. While these patents show that the art of space station construction is a well developed one, a need remains fro further improvements in such construction, in order to improve safety, ease and versatility of handling and interconnection, and interconnection of utilities among modular units making up a space station or other controlled atmosphere environment.

SUMMARY OF THE INVENTION

Accordingly, it is an object of this invention to provide a space station that is deployable as space shuttle cargo in stages.

It is another object of the invention to provide a construction form for a space station or other controlled atmosphere environment which will provide a maximum efficiency connectivity and packing density of controlled atmosphere modules making up the space station or other environment.

It is a further object of the invention to provide a laterally approachable berthing mechanism for modular assembly of a space station.

It is yet another object of the invention to provide an improved form of utilities hookup for connecting modules in a modular controlled atmosphere construction.

It is another object of the invention to provide an omnidirectionally symmetrical space station berthing hub with a reverse angle cone of approach for docking or other interconnection.

It is a further object of the invention to provide a space station structure in which modules making up the space station have their center of gravity controllable in close proximity to their center of shape symmetry.

It is another object of the invention to provide a space station or other controlled atmosphere environment employing a standardized shell structure using hemispherical end caps for modules and to form spherical hubs.

It is yet another object of the invention to provide a modular space station assembly in which utilities connections can be made in a shirtsleeves environment that allows fine finger manipulation of utility connectors.

The attainment of the foregoing and related objects may be achieved through use of the novel space station architecture, interconnection assembly, berthing hub and utilities connection channel herein disclosed. A space station architecture in accordance with this invention has a controlled atmosphere environment with a plurality of interconnected modules having opposed connection ports with active mechanisms which are sideways connectable to a passive port of a berthing hub. The modules are desirably interconnected in a triangular configuration in two dimensions and a tetrahedral configuration in three dimensions. The result is a fully packed, symmetrical, self-rigidizing structure with a center of gravity in close proximity to its center of shape symmetry.

In another aspect of the invention, a spherical, polyhedral, or spherical derivative hub is used for docking and for module interconnection. The docking hub has a reverse angle cone of approach when employed for docking purposes. It also includes a maximum of 14 berthing ports all at 60 degrees face angles from each other.

In a further aspect of the invention, the hub incorporates a utilities connector channel which distributes gases, electric power communications, data links, control circuits, water and other fluids throughout the interconnected modules and docked transport ship in an improved manner through use of extendable opposing conduits adapted to interlock with mating sockets imbedded in the modules and hub pressure shells.

Because the triangulated structure is self-rigidizing, without requiring resistance to bending movements or torques at the hubs, the hubs need not be designed to resist bending or torques. This geometrical advantage will allow significant reduction in structural weight and depth. Because it is not necessary to resist bending and torques in this non-rectangular structure, it is possible to provide noise and vibration isolation between modules, which is very difficult, if not impossible in cartesian coordinate/rectangular configurations.

Further, the triangular/tetrahedral station has specific flight attitude and controllability properties. The triangular, two-dimensional planar station has advantages in terms of minimal atmospheric drag, equalized aerotorques with the center of pressure aligned with the center of gravity. It has the ability to fly in an earth-inertial, gravity gradient mode where the long axis through the center of the mass will point towards the center of the earth as a natural flight attitude. This flight attitude will allow the use of gravity gradient countertorques to counterbalance the aerotorques acting on solar arrays used to power the station.

The tetrahedral, three-dimensional station has other properties. Because it is self-rigidizing and omnidirectionally symmetrical, it can fly in an isotropic manner. That is, there is no natural preference for any orientation, so that the entire station can be rotated or otherwise maneuvered for orientation in any flight attitude, with minimum imbalance in its controllability. The atmospheric drag profile of the tetrahedral station is bigger than the triangular/planar station, but it can fly in generally symmetrical modes that will allow equalization and cancellation of aerotorques.

The connectors allow easy manual access for maintenance, repair, modification and replacmeent of utility systems in a shirtsleeves environment.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 2 is a longitudinal section view taken along the line 2—2 in FIG. 2a of a berthing mechanism for assembling hubs and modules in accordance with the invention.

FIG. 2a is a cross section view taken along the line 2a—2a in FIG. 2.

FIG. 3 is a longitudinal section view taken along the line 3—3 in FIG. 3a of a portion of the assembly in FIG. 2, but in another stage of assembly, with a strutural clamp closed.

FIG. 3a is a cross section view taken along the line 3a—3a in FIG. 3.

FIGS. 12a through 12f are plan views showing sequential assembly of a space station in accordance with the invention.

DETAILED DESCRIPTION OF THE INVENTION

Figure 1:
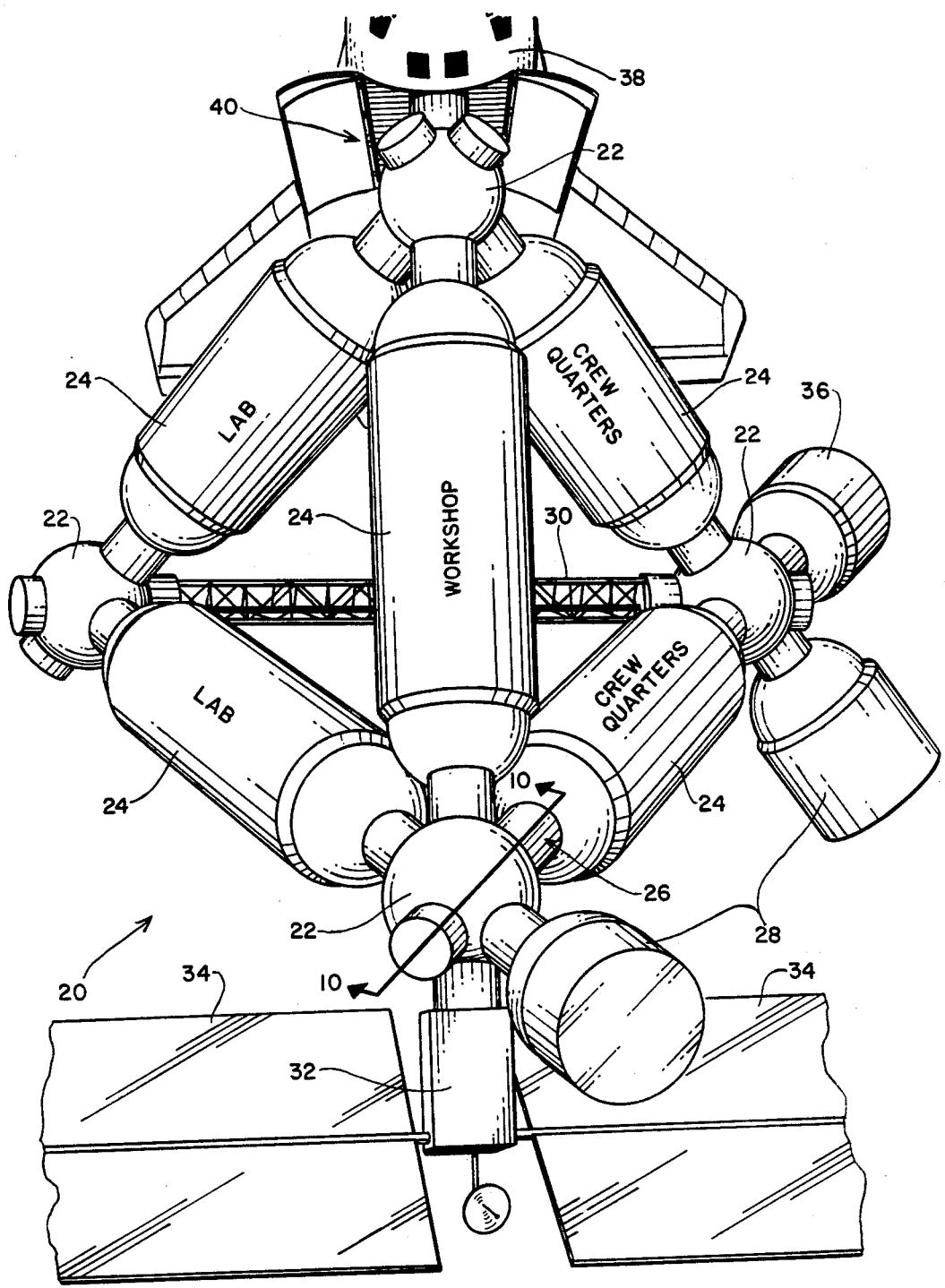
FIG. 1 is a perspective view of a tetrahedral space station in accordance with the invention.

Turning now to the drawings, more particularly to FIGS. 1–4, there is shown a space station assembly 20 with berthing hubs 22 in accordance with this invention. Modules 24 are assembled by the hubs 22 in a triangular configuration in two dimensions and a tetrahedral configuration in three dimensions, using a berthing mechanism 26, shown in FIGS. 2–4, to be described below, The cylindrical modules 24 may be outfitted in their interior to serve a variety of different uses in the space station, as indicated by the labels in FIG. 1. Other equipment and modules may be attached to or incorporated into the space station 20, including logistics modules 28, a payload berthing or construction beam 30, a power resources module 32, including solar cell panels 34, and detachable experiment/laboratory module 36. As shown, one of the hubs 22 is employed for berthing space shuttle 38, using the same linkage assembly 26 used to attach modules 24 and the other components of the space station 20 together through the hubs 22, or the standard Apollo-Soyuz type single vector port (for shuttle only). Because the shuttle berthing hub 22 is located on an outside of an acute corner 40 of the tetrahedral configuration, the shuttle berthing hub 22 provides a "reverse" approach cone, making the berthing operation less difficult than with a more confining approach cone to a straight or planar surface.

The space station 20 of FIG. 1 is shown in the configuration of a single tetrahedron. However, larger space stations made up of multiple tetrahedra comprised of hubs and modules assembled from modules 24 interconnected through hubs 22 and with berthing mechanisms 26 may be constructed. Significant advantages are obtained through use of such a tetrahedral form of construction arising from the self stabilizing or rigidizing, space filling, and equal interior and exterior angle properties of a tetrahedreon. The space station 20, as well as larger space stations incorporating many tetrahedrons, are structurally stable and are omnidirectionally symmetric. In particular, the omnidirectional symmetry means that a close correlation can be maintained between a triangular or tetrahedral space station's shape symmetry and center of gravity. Such a close correlation is advantageous for orienting and moving the space station with thrusters and similar means of propulsion.

Figure 4:
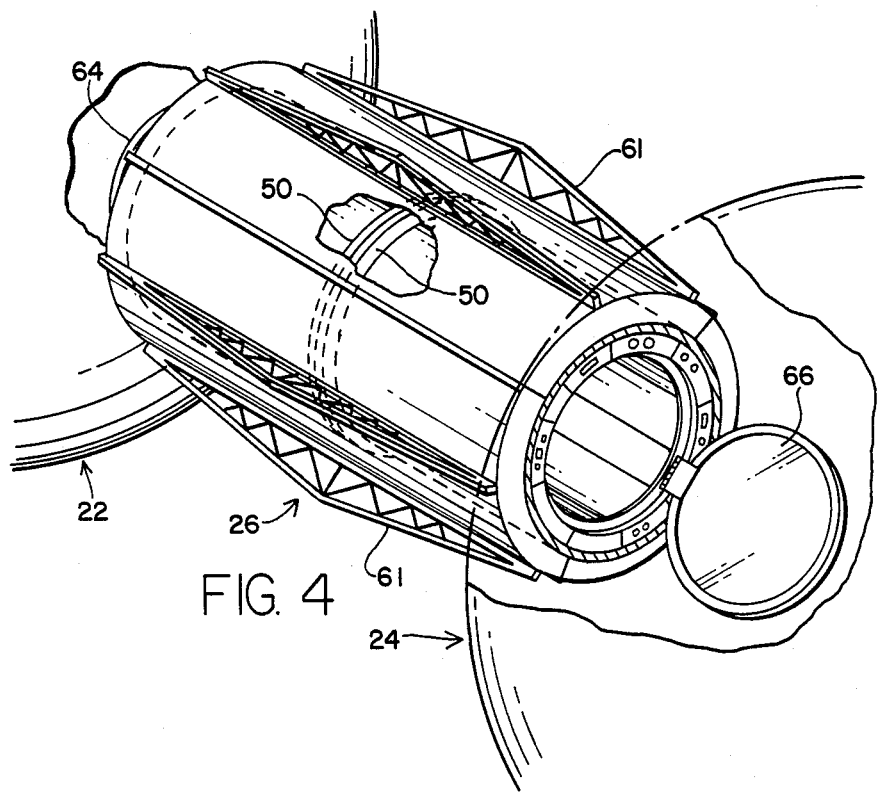
FIG. 4 is a perspective view of the assembly shown in FIG. 3, but at the completion of assembly.

FIGS. 2–4 show details of the berthing mechanism 26 of the space station 20 in FIG. 1 at various stages in the process of assembly. Module 24 and hub 22 each have flanged ports 50, which mate together to form the primary pressure seal 26. A clamp 52 consists of sections 54, 56 and 58, which are connected together by hinges 60 along their length. Radial stiffeners 61 are provided around the sections 54–58, for structural strength in the completed assembly. In the process of assembly, the module 24 and hub 22 are moved laterally together to the position shown in FIG. 2, with the section 56 of the clamp 52 engaging both flanged ports 50. With the structural axes of the flanged ports 50 aligned in this manner, sections 54 and 58 of the clamp 52 are closed and latched loosely to allow rotation but not separation, to give the configuration shown in FIG. 4. Module 24 is then rotated about the structural axis of its flanged port 50 as necessary to align utilities connections within the assembly 26, to be described below. The clamp 52 is then tightened and secured. A primary pressure seal 63 (FIG. 3) is made at the mating flanges 62, and the assembly 26 is then pressurized. Hatches 64 and 66 in the hub 22 and the module 24 may now be opened by swinging or translating. Utilities channel connections 68 may now be inserted into the berthing assembly 26 in a "shirtsleeves" environment to complete the connection of module 24 and hub 22. This process of assembly is used to interconenct all of the modules and hubs of the space station 20, and may also be applied to docking with the space shuttle 38.

Figure 5:
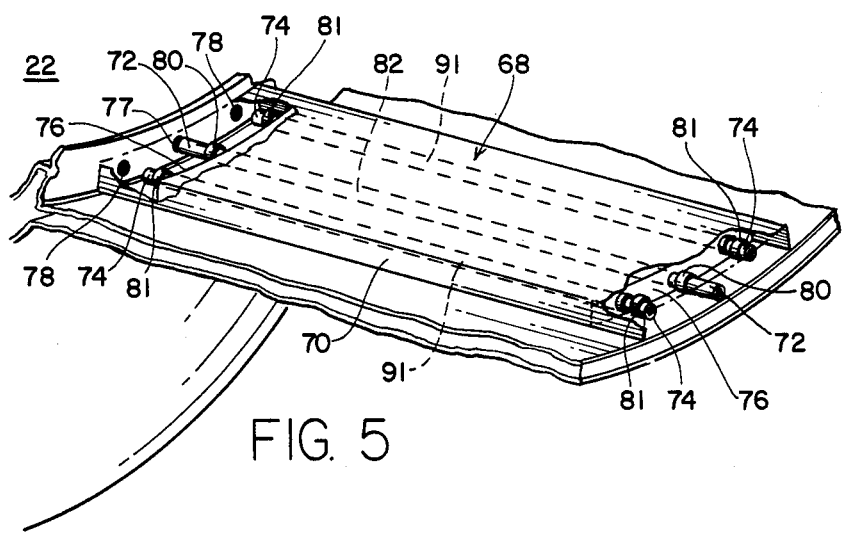
FIG. 5 is a perspective view of a utility connection channel in accordance with the invention.

An example of a utilities connection channel 68 is shown in FIG. 5. The connection channel 68 has a shell 70 with a radius of curvature configured to fit into the berthing assembly 26. Utility connector 72 and electrical connectors 74 are mounted inside channel housing 70. When the connection channel 68 is installed in the assembly 26, the utility connector 72 and the electrical connectors 74 are aligned opposite utility aperture 77 and electrical apertures 78, respectively. An actuator 80 on each end of the utility connector 72 is turned by an automated mechanism or by hand to extend the utility connector 72 into its corresponding utility aperture 77. Similar actuators 81 inside the channel housing on each end of the electrical connectors 74 are turned to extend the electrical connectors 74 into electrical apertures 78 in module 24 and hub 22.

Figure 6:
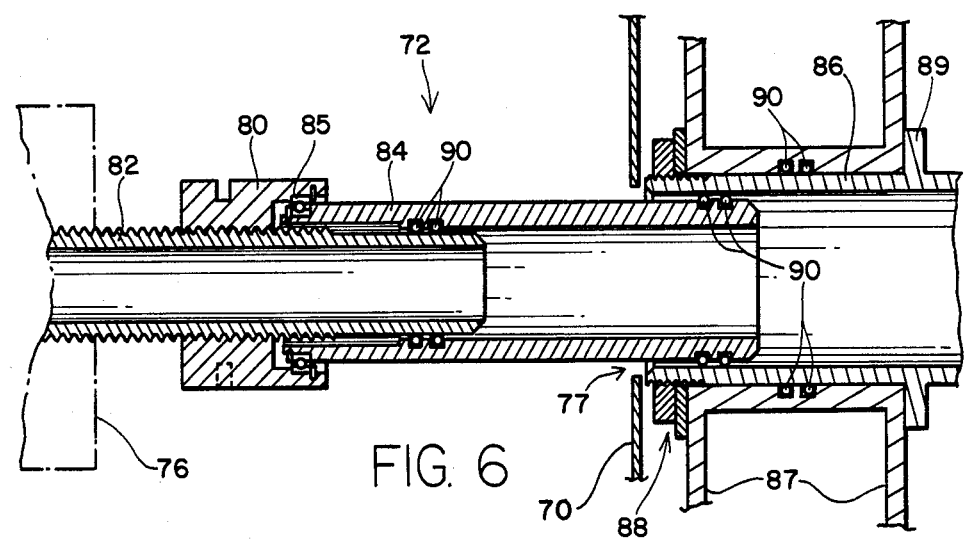
FIG. 6 is a cross section view of a portion of the utility connection channel for fluid and gas utilities shown in FIG. 5.

Details of the gas or fluid utility connector 72 and the utility aperture 77 are shown in FIG. 6. Tube 82 is fixedly mounted within the channel housing 70 at fixed mount 76. Actuator 80 is in the form of a driven nut which is threaded to the utility tube 82. End 84 of the utility connector 72 is connected to the actuator drive nut 80 by means of bearing 85, so that drive nut actuator 80 can rotate relative to the end 84. Fitting 86 into which the end 84 of connector 72 is extended by rotation of the drive nut actuator 80 is embedded in pressure shell wall 87 of the hub 22 by means of locknut and washer 88 and flange 89. Gaskets 90 ensure a hermetic seal among the tube 82, end 84, fitting 86 and wall 87. In use, the connection channel 68 is positioned so that end 84 is opposite aperture 77, and a spanner or similar wrench is manually or automatically used to drive nut 80 to advance the connector tip 84 into the utility aperture 77.

Figure 7:
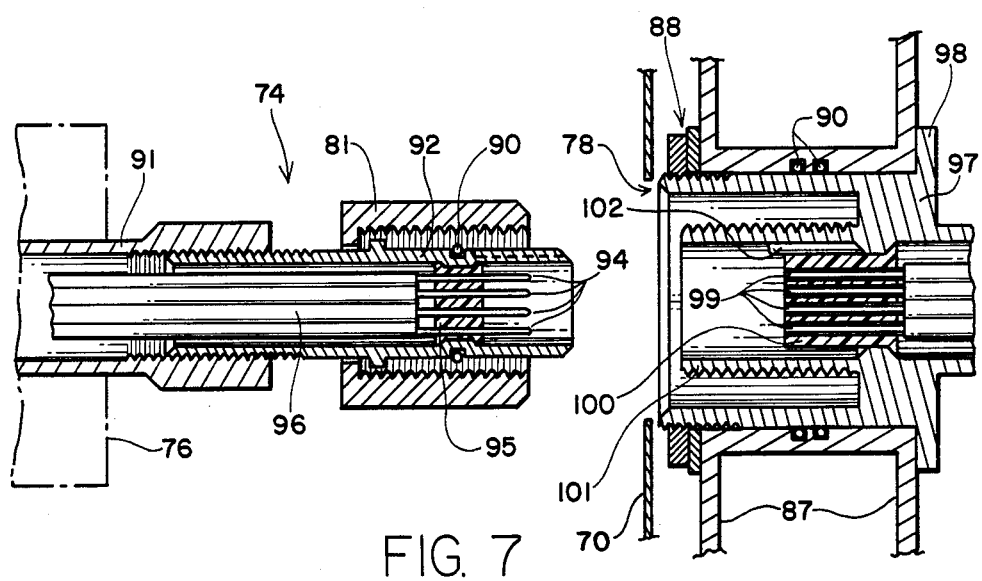
FIG. 7 is a cross section view of another portion of the utility connection channel for electrical utilities shown in FIG. 5.

Details of the electrical connector 74 are shown in FIG. 7. As in the case of the utility tube 82, the electrical cable 91 extends from the fixed mount 76 of the connection channel shell 70. A connector end 92 is threaded to the cable 91. Male connector pins 94 are mounted through block 95 and are attached to wires 96 within cable 91.

Also as in the utility connector 72, electrical apertures 78 are formed in an imbed fitting 97 extending through pressure walls 87 of the hub 22. Flange 98 and a locknut and washer 88 fix the imbed fitting 97 in place. Female connection pins 99 extend through block 100 within the imbed fitting 97. Threaded end 101 extends within the electrical aperture 78 surrounding the female connection pins 99, and is dimensioned to receive the connector end 92. A guide ridge 102 within the end 101 assures proper orientation of the end 92 within end 101 for mating of the male pins with the female pins 96. Nut tightener 91 advances the end 92 within the end 101. Gaskets 90 provide a hermetic seal among walls 87, imbed fitting 97 and ends 92 and 101.

Figure 8:
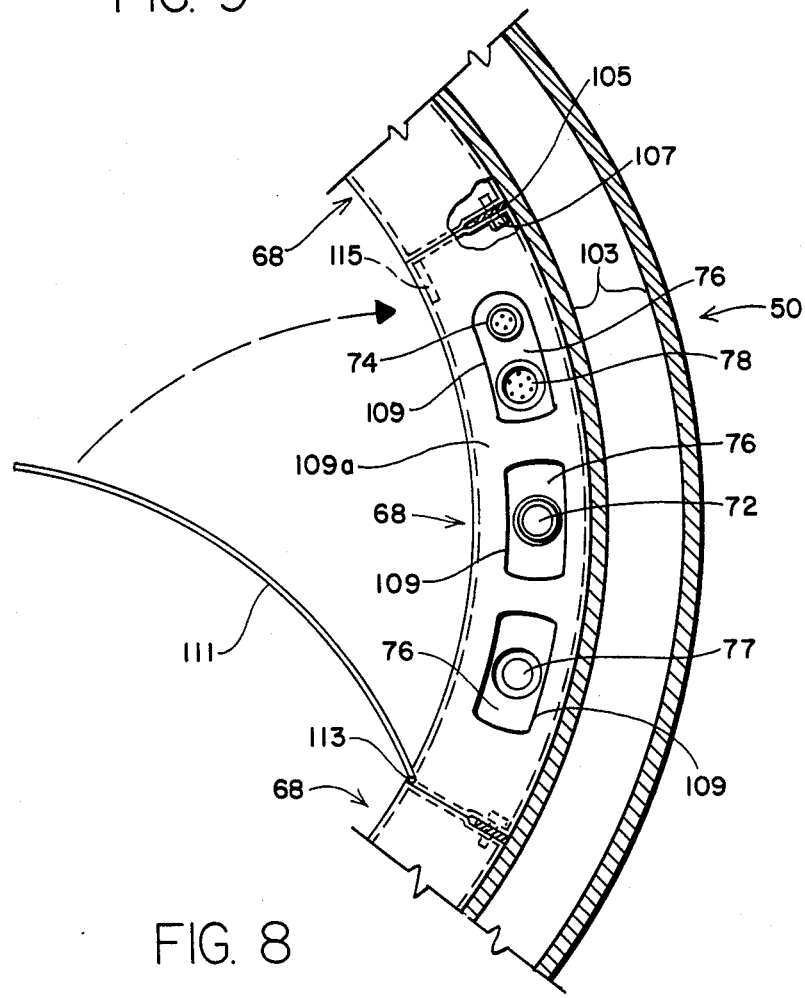
FIG. 8 is an end view of the utility connection channel of FIG. 5.

FIG. 8 shows additional details of the installation of the connection channels 68. Connection channels 68 are mounted to the inside surface of pressure shells 103 of the berthing ports 50 by means of index and anchoring support tabs 105 and bolts 107. Openings 109 in end wall 109a of the port 50 allow some flexibility in the location of male electrical connectors 74, female electrical apertures 78, male utility fluid or gas connectors 72 and female utility apertures 77, all of which are provided either in the mounts 76 of the connector channel 68 or in the hub 22 in mating relationship. Each connector channel 68 has a cover 111, hinged at 113 and latched at 115 to protect the utilities from adjacent through traffic and allow access to the interior of connection channel 68 for maintenance and installation. In practice, the connection channel 68 can be fabricated from light gauge aluminum or other sheet metal.

Figure 9:
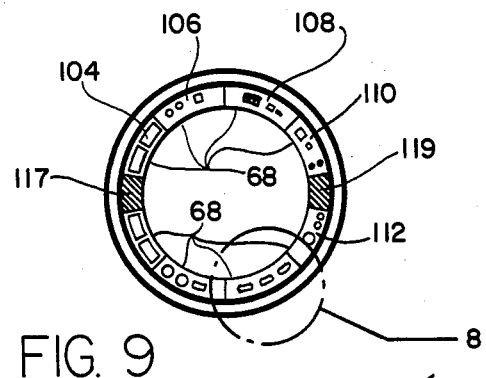
FIG. 9 is a cross section view taken along the line 8—8 in FIG. 4 and showing utility connection channels as in FIG. 5 in place in the assembly of FIG. 4.

FIG. 9 shows a layout of completed utilities connections in the berthing assembly 26. With the exception of the arc-segments of hatch hinge 117 and hatch latch 119, the connector channels 68 are installed in the entire circumference of the linkage assembly 26. The connector channels 68 can include a pneumatics channel 104, an intercom and video channel 106, a computer data link channel 108, a thermal coolant channel 110, and an electrical power channel 112. Duplicates of these channels 104–112 and other channels 68 are provided around the circumference of the assembly 26 as needed, in mirror image or inverted mirror image configuration.

Figure 10:
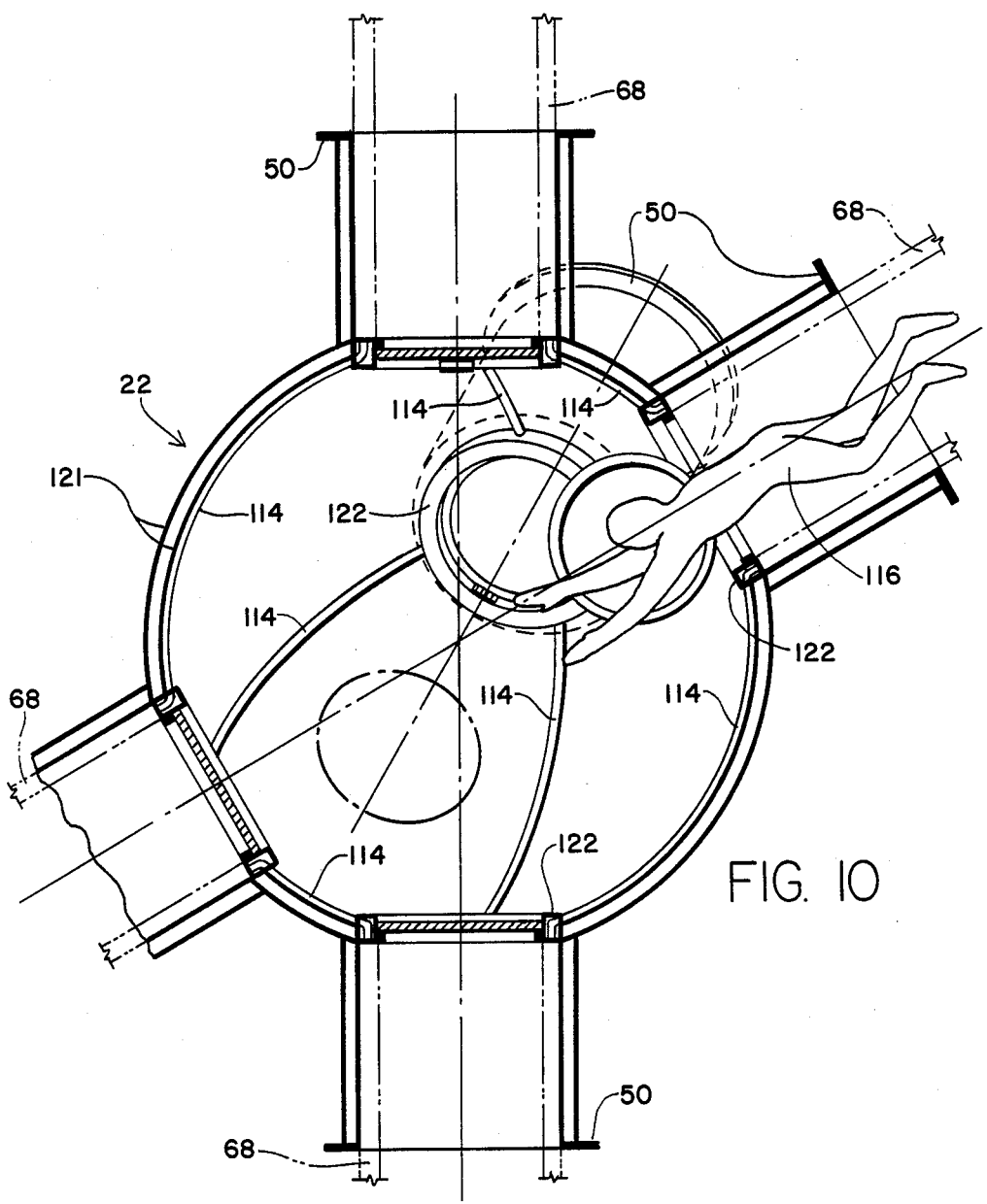
FIG. 10 is a cross section view taken along the line 10—10 in FIG. 1, showing details of a spherical berthing hub in accordance with the invention.

FIG. 10 shows further details of the hubs 22 in the space station 20. The flanged berthing ports 50 are spaced around the spherical or polyhedral interior of the hub 22. A total of six (in the figure) such ports 50 are provided in the hub 22, although a greater or lesser number of such ports can be provided for potential interconnections, with the limiting number of ports being determined by spacing required for the modules or other space station parts to be connected to the hub 22. Utilities lines 114 extend within the hub 22 and are fed into each port 50 for connection in a berthing assembly 26 incorporating the port 50. Utilities lines 114 extend between ports 50 in great circle arcs from inner collar 115 to inner collar 115. Person 116 passes through the ports 50 and the hub 22 while passing from one module 24 to another module 24 in the space station 20. Connection channels 68 extend between the flanged ports 50 of adjacent hubs 22 and modules 24. The hub 22 is formed from double walls 121.

Figure 11:
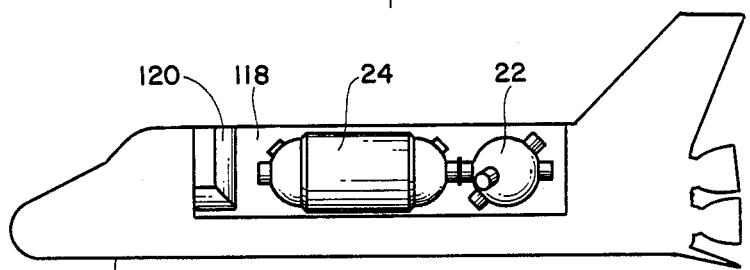
FIG. 11 is a side and partial cross section view showing transport in a space shuttle cargo bay of space station components in accordance with the invention.

FIG. 11 shows how modules 24 and hubs 22 making up the space station 20 may be raised into orbit using the space shuttle 38. The placement of the denser hub at the stern/bottom of the cargo bay will conserve the critical location of the total shuttle cargo center of gravity envelope. A module 24 and a hub 22 may be interconnected on the ground and inserted in the cargo bay 118 of the shuttle 38. In this manner, a minimal configuration space station consisting of three modules 24, three hubs 22, and several smaller modules and other parts may be raised into orbit in four shuttle launches. FIG. 10 also shows a docking and airlock port 120 for docking the shuttle 38 to the space station 20, in the same manner of interconnection assembly explained above for the space station 20 itself, or using existing Apollo-soyuz type docking technology.

FIGS. 12a through 12f show an assembly sequence for a space station 150 based on a two dimensional triangle form of construction, which shows that a close correlation between axes of shape symmetry and centers of gravity may be maintained for the space station 150 as it grows. When the total mass of the space station is smaller, a more eccentrically located center of gravity can be allowed, but as the total mass increases, the center of gravity approaches closer to the symmetry of the station. In FIG. 12a, a logistics module 28 and a power resources module 32 are interconnected by hub 22. Center of gravity 200 of this assembly is slightly to one side of axis of symmetry 154. In FIG. 12b, a module 24 has been added to the assembly, along with a reboost module 156 for repositioning the space station 150 in its orbit. Center of gravity 200 of the space station 150 is slightly to one side of axis of symmetry 160 for the module 24. In FIG. 12c, a second module 24 has been connected to the hub 22, a second logistics rack 28 has been added and the reboost module 156 in FIG. 12b has been relocated and a beam 30 has been installed as a temporary construction brace for the modules 24. In this configuration, the center of gravity 200 and axis of shape symmetry 154 almost coincide. In FIG. 12d, two more hubs 22 with logistics racks 28 and reboost modules 156 have been added. Beam 30 now connects the two additional hubs 22. The center of gravity 200 of this assembly remains almost on the axis of shape symmetry 154. In FIG. 12e, a third module 24 is connected between the second and third hubs 22, a second power module 32 is installed on the third hub 22, and the beam 30 is stowed parallel to the third module 24. The center of gravity 200 of space station 150 is now slightly to one side of the axis 154. The FIG. 12f, the first power module 32 has been relocated to the second hub 22, so that the two power modules 32 are at opposite ends of the station 150. A fourth and fifth module 24 have been added, to form a new triangle in the station 150. A fourth hub 22 has been added, and logistics racks 28 and reboost modules 156 are included and relocated as required. Center of gravity 200 and the cross-axes of shape symmetry 154 now coincide. This configuration allows ready reorientation and reboosting of the enlarged space station 150. In a similar manner, the space station 150 may be further enlarged in two or three dimensions by forming additional triangular assemblies of hubs 22 and modules 24.

Figure 13:
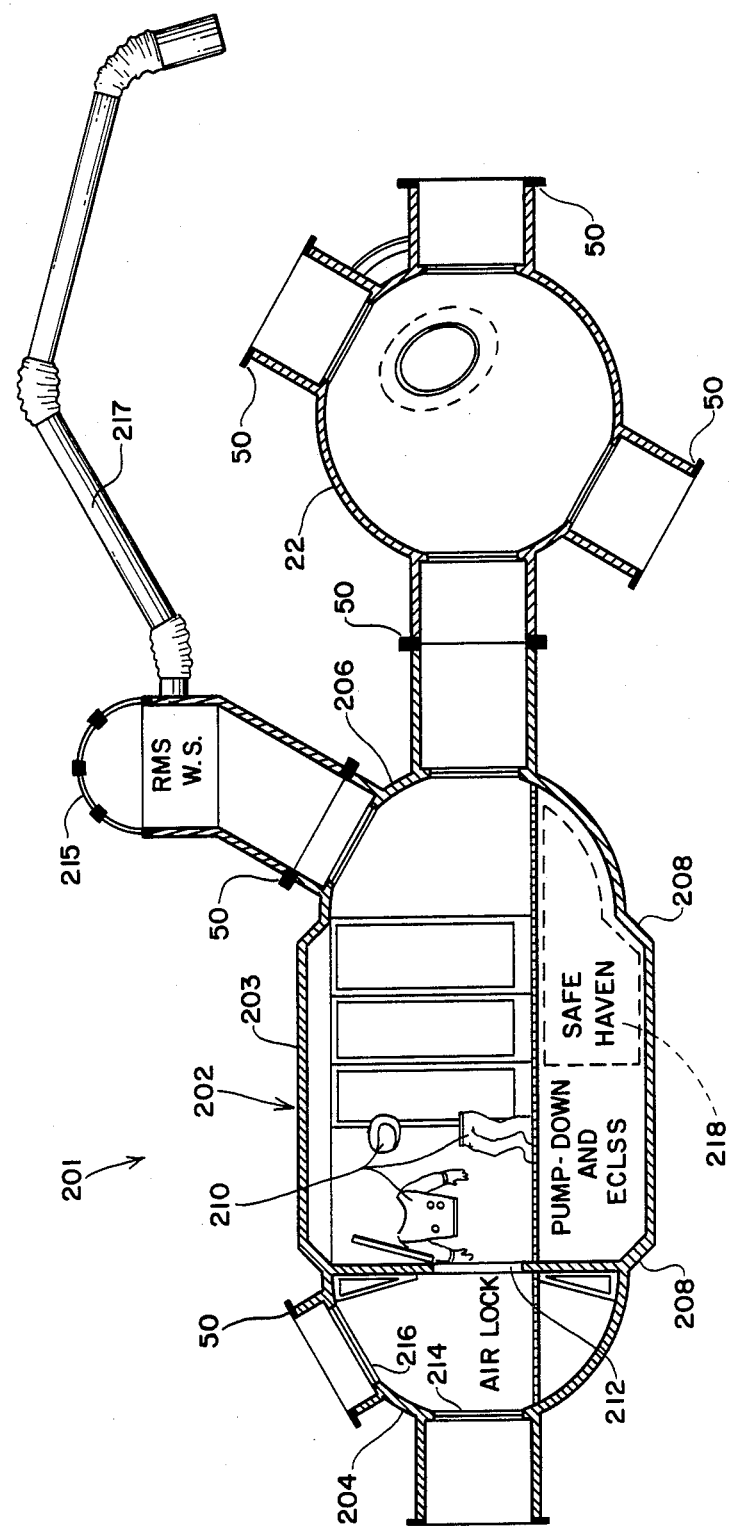
FIG. 13 is a side section and elevation view of a typical module and hub pair of another embodiment of the invention.

FIG. 13 shows a portion of another embodiment of a space station 201 in accordance with the invention; a typical module and berthing hub pair. The embodiment incorporates a berthing hub 22 as employed in the FIGS. 1–12 embodiments. Module 202 incorporates a cylinder 203 with hemispherical or hemi-polyhedral end caps 204 and 206. The hemispherical end caps 204 and 206 have flanged ports 50 of the same type as the flanged ports 50 of the spherical berthing hub 22. The module with its hemispherical end caps carries the active portion of the berthing mechanism, and the hub ports carry the passive portion. As shown, the hemispherical end caps 204 and 206 have a diameter somewhat less than the diameter of cylinder 203, for example, 12 feet for the end cap diameter and 14 feet for the cylinder diameter. In this embodiment, the diameter of end caps 204 and 206 is the same as the diameter of hub 22. A frustoconical adapter section 208 at each end of the cylinder 203 joins the cylinder 203 to the hemispherical end caps 204 and 206. If desired, the end caps could have the same diameter as the cylinder 203 and be directly connected to it.

As shown, the hemispherical end cap 204 is configured as an air lock. If desired, the on axis flanged port 50 of the end cap 204 may be connected to another module, either directly, or through a berthing hub 22. The other flanged port 50 is used for access to space.

In use of the air lock formed by hemispherical end cap 204, an Extra Vehicular Activity (EVA) suit ("space suit") 210 is stored near hatch 212 connecting the end cap 204 and the cylinder 203. An astronaut or team of astronauts puts on the space suit 210, enters the hemispherical end cap 204, seals each hatch 212, 214 and 216, pumps down the end cap airlock 204, and then exits from the space station 200 through the hatch 216.

This airlock can be sized to accommodate a larger team of astronauts going out EVA than the current shuttle airlock which accommodates only two.

A different use is shown for the hemispherical end cap 206. The end cap 206 serves to increase the available space in cylinder 203, as a connector to the berthing hub 22 through one flanged port 50, and as a connector through a second flanged port 50 to observation dome 215 for mechanical arm remote manipulator system (RMS) 217, used to manipulate equipment outside the space station 200 from within the station.

As indicated in FIG. 13, the module 202 may be laid out to include a variety of functions, including a protected safe haven emergency supply package 218, which, in the event of significant damage to the space station 200, will support life for the crew independently in that module for a period of time (such as 30 days) until repairs or rescue can be effected.

The hemispherical end caps 204 and 206 provide a number of advantages for the space station 200. Since the end caps 204 and 206 are based on the same form factor as the hubs 22, common tooling can be used. The end caps 204 and 206 can be used for a variety of purposes, thus increasing the options available in the assembly of the space station 200. Hatch 216 of the end cap 204 may be used as an alternative access to the cylinder 203 when the flanged port 50 of hatch 214 has already been blocked off in the space shuttle 38 prior to launch. Such an alternative access is highly convenient for last minute loading of, for example, life sciences experiments just prior to shuttle launch.

It should now be readily apparent to those skilled in the art that a novel space station, berthing mechanism assembly, berthing hubs and utility connection channels common module shell capable of achieving the stated objects of the invention has been provided. Through use of the triangular and tetrahedral space station architecture of this invention, a space filling structure of modules may be arranged with omnidirectional symmetry. The sideways approachable coupling assembly facilitates both assembly of the space station and docking. The connection channel provides a convenient utilities feed through as modules are added to the space station. Critical connection functions are separated by a vector both in time and in space. The component parts of a space station in accordance with this invention may be raised into orbit with a small number of space shuttle launches and assembled into the completed space station easily. Such a space station may grow into a large installation over time through the addition of additional modules and couplings.

It should further be apparent to those skilled in the art that various changes in form and detail of the invention as shown and described may be made. For example, the hub 22 and end caps 204 and 206 in FIG. 13 could be polyhedral in configuration. It is intended that such changes be included within the spirit and scope of the claims appended hereto.

What is claimed is:

1. A controlled atmosphere environment comprising a plurality of elongated controlled atmosphere modules each having flanged ports which share a common longitudinal axis and are at opposite module ends, means including similar shaped flanged ports for interconnecting said modules in a port-to-port arrangement so as to form a closed loop with each port of a module facing a port of said interconnecting means, said interconnecting means including means for clamping together each pair of facing ports, said clamping means including hingeable segments that overlap said facing ports so that in the assembly of said environment the ports of each module may be brought into facing relationship with their respective ports of said interconnecting means and into engagement with said clamping means by moving the module ports sideways with respect to the interconnecting means ports and said clamping means.

2. The controlled atmosphere environment of claim 1 in which said modules are interconnected to form a triangular configuration closed loop path in two dimensions.

3. The controlled atmosphere environment of claim 1 in which said modules are interconnected to form a plurality of triangular configuration, interconnected closed loop paths in three dimensions.

4. The controlled atmosphere environment of claim 3 in which the plurality of triangular configuration, interconnected closed loop paths in three dimensions forms at least one tetrahedral configuration plurality of closed loop paths.

5. The controlled atmosphere environment of claim 1 in which said environment is a space station.

6. A controlled atmosphere environment comprising a plurality of interconnected modules having opposed connection ports configured to be connectable to a like port of another module in the environment by sideways movement with respect to said like port, said modules being interconnected to form a plurality of triangular configuration, interconnected closed loop paths in three dimensions, said environment including a berthing hub located on an outside corner of said interconnected modules to give a reverse angle cone of approach for berthing.

7. The controlled atmosphere environment of claim 6 in which said berthing hub comprises a substantially globular shell chamber with a plurality of connectable connection ports configured to be connected by sideways movement with respect to a like port.

8. The controlled atmosphere environment of claim 7 in which said substantially globular shell chamber is a spherical chamber.

9. A controlled atmosphere environment comprising a plurality of interconnected modules having opposed connection ports configured to be connectable to a like port of another module in the environment by sideways movement with respect to said like port, said connection ports being joined together by an assembly including a plurality of latch sections hinged together along their length and extending circumferentially around said connecting ports, and a pressure seal between said connection ports.

10. The controlled atmosphere environment of claim 9 in which said assembly additionally includes a utilities feedthrough connection channel extending between said connection ports.

11. A berthing assembly for a controlled atmosphere environment, which comprises first and second axially aligned and opposed, flanged connecting ports, a plurality of latch sections hinged together along their length and extending circumferentially around said connecting ports, and a pressure seal between said connection ports.

12. The berthing assembly of claim 11 further comprising a utilities feedthrough channel extending between said connection ports.

13. A berthing assembly for a controlled atmosphere environment, which comprises first and second axially aligned and opposed, flanged connecting ports, a plurality of latch sections hinged together along their length and extending circumferentially around said connecting ports, a pressure seal between said connection ports, and a utilities feedthrough channel extending between said connection ports, said utilities feedthrough channel comprising a shell with a radius of curvature dimensioned to engage a wall of a passageway defined by the connection ports, a plurality of utilities connecting members positioned along opposing ends of said shell and being movably mounted for extension from the ends and withdrawal toward the ends, means connected to said connecting members for extending and withdrawing said connecting memberes, and means to form a hermetic seal with mating connecting members in the controlled atmosphere environment.

14. A utilities feedthrough channel for a modular controlled atmosphere environment, which comprises a shell with a radius of curvature dimensioned to engage a wall of a passageway defined by interconnected ports of modules in said environment, a plurality of utilities connecting members positioned along opposing ends of said shell and being movably mounted for extension from the ends and withdrawal toward the ends, means connected to said connecting members for extending and withdrawing said connecting members, and means to form a hermetic seal with mating connecting members in the modules.

15. A berthing hub for a controlled atmosphere environment formed from a plurality of modules, which comprises a substantially globular walled enclosure having a plurality of openings, each opening having a cylindrical port extending through the enclosure wall, said ports having a flanged distal end for attachment to a like flanged port on the modules said openings being arranged in said walled enclosure so that the modules, when connected through a plurality of said berthing hubs, may be arranged in a triangular configuration in two dimensions.

16. The berthing hub of claim 15 in which said openings are arranged in said walled enclosure so that the modules, when connected to said berthing hub, may be arranged in a tetrahedral configuration in three dimensions.

17. The controlled atmosphere environment of claim 15 in which said substantially globular walled enclosure is a spherical enclosure.

18. A controlled atmosphere module, which comprises a cylindrical chamber having a substantially dome-shaped end cap with a plurality of openings, each opening having a flanged, cylindrical port extending from said dome end cap, said substantially dome-shaped cap being attached to said cylindrical chamber by means of a frustoconical band adapter section.

19. The controlled atmosphere module of claim 18 in combination with a berthing hub comprising a substantially globular walled enclosure having a plurality of openings, each opening having a cylindrical port extending through the enclosure wall, said ports having a flanged, distal end, said hub being attached to one of said plurality of flanged cylindrical ports of said module.

20. The controlled atmosphere environment of claim 19 in which said substantially globular walled enclosure is a spherical enclosure.

21. The controlled atmosphere module of claim 18 in combination with an observation dome connected to one of said plurality of flanged ports of said module.

22. The module of claim 18 in which said dome-shaped end cap is an air lock.

23. The controlled atmosphere environment of claim 18 in which said substantially dome-shaped end cap is a hemispherical end cap.

24. The controlled atmosphere module of claim 18 in which said substantially dome-shaped end cap is hemispherical.

25. A method for assembling a space station, which comprises interconnecting a plurality of modular components in a configuration in which a center of gravity of the space station and an axis of shape symmetry are maintained in proximity to one another, and repositioning at least some of said plurality of modular components as additional modular components are added to the space station so as to maintain proximity between the center of gravity of the space station and the cross axes of shape symmetry of the space station.

26. The method of claim 25 in which at least one of said modular components is a reboost module.

27. A controlled atmosphere environment, which comprises a plurality of elongated controlled atmosphere modules interconnected with substantially globular-walled hubs in a two-dimensional triangular configuration.

28. The controlled atmosphere environment of claim 27 in which said plurality of controlled atmosphere modules is interconnected in a tetrahedral configuration in three dimensions comprising a plurality of the triangular, closed loop paths.

29. The controlled atmosphere environment of claim 27 in which said environment is a space station.

30. A space station comprising a plurality of elongated controlled atmosphere modules and a plurality of substantially globular-walled hubs, said modules and said hubs each having ports, said modules and hubs being interconnected at their ports to form a sealed environment having at least one triangular-shaped, closed loop path in two dimensions.

31. The space station of claim 30 in which said sealed enviounment forms a plurality of interconnected, triangular-shaped, closed loop paths in three dimensions.

32. The space station of claim 31 in which said plurality of interconnected triangular-shaped, closed loop paths forms at least one tetrahedron.

33. The space station of claim 32 in which said plurality of interconnected triangular-shaped closed loop paths forms a plurality of interconnected tetrahedrons.

* * * * *